US012773996B2

(12) United States Patent
Matsunaga et al.

(10) Patent No.: US 12,773,996 B2
(45) Date of Patent: Oct. 27, 2026

(54) ROAD SURFACE BASED MOBILE OBJECT TRAVEL STATE CONTROLLER

(71) Applicant: HONDA MOTOR CO., LTD., Minato-ku (JP)

(72) Inventors: Hideki Matsunaga, Wako (JP); Takashi Matsumoto, Wako (JP); Ryoji Wakayama, Wako (JP); Koki Aizawa, Wako (JP); Kento Shirakata, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 18/850,222

(22) PCT Filed: Mar. 29, 2022

(86) PCT No.: PCT/JP2022/015417
§ 371 (c)(1),
(2) Date: Sep. 24, 2024

(87) PCT Pub. No.: WO2023/187975
PCT Pub. Date: Oct. 5, 2023

(65) Prior Publication Data

US 2025/0206315 A1 Jun. 26, 2025

(51) Int. Cl.
*B60W 30/182* (2020.01)
*B60W 30/14* (2006.01)
(Continued)

(52) U.S. Cl.
CPC ........ *B60W 30/182* (2013.01); *B60W 30/146* (2013.01); *B60W 50/082* (2013.01);
(Continued)

(58) Field of Classification Search
CPC ............ B60W 30/182; B60W 30/146; B60W 50/082; B60W 2050/146;
(Continued)

(56) References Cited

U.S. PATENT DOCUMENTS 5,999,865 A 12/1999 Bloomquist et al.
6,491,122 B2 12/2002 Leitner et al.
(Continued)

FOREIGN PATENT DOCUMENTS

CN 101401762 4/2009
CN 108885835 11/2018
(Continued)

OTHER PUBLICATIONS

DE102018206044, Method for Operating a Motor Vehicle, Roth, English Translation provided by Espacenet. Cover sheet provided by IP.com. Provided as a PDF. (Year: 2021).*
(Continued)

*Primary Examiner* — Jason Holloway
*Assistant Examiner* — Benjamin J Brosh
(74) *Attorney, Agent, or Firm* — Amin, Turocy & Watson, LLP

(57) ABSTRACT

Provided a device for controlling a mobile object which one or more occupants are on board and which is movable both on a roadway and in a predetermined region different from the roadway, the device including: a road type recognizer configured to recognize which type of road the mobile object is moving on, out of the roadway and the predetermined region, on the basis of an output of an external detection device; and a controller configured to move the mobile object in either a first travel state in which a speed of the mobile object is limited to a first speed or a second travel state in which the speed of the mobile object is limited to a second speed lower than the first speed on the basis of the
(Continued)

recognized road type, wherein the controller moves the mobile object in the first travel state in a case where it is recognized that the mobile object is moving on the roadway, moves the mobile object in the second travel state in a case where it is recognized that the mobile object is moving in the predetermined region, and forcibly switches the travel state under control even in a case where it is recognized that the mobile object is moving on the roadway or in the predetermined region when an operation for switching the travel state is performed by a switching operation unit that accepts a switching operation of the travel state performed by the occupant.

8 Claims, 6 Drawing Sheets

(51) Int. Cl.
*B60W 50/08* (2020.01)
*B60W 50/14* (2020.01)
*G06V 20/56* (2022.01)

(52) U.S. Cl.
CPC ........... *B60W 50/14* (2013.01); *G06V 20/588* (2022.01); *B60W 2050/146* (2013.01); *B60W 2300/34* (2013.01); *B60W 2420/403* (2013.01); *B60W 2552/05* (2020.02); *B60W 2552/53* (2020.02); *B60W 2556/45* (2020.02)

(58) Field of Classification Search
CPC ....... B60W 2420/403; B60W 2552/05; B60W 2552/53; B60W 2556/45; G05D 1/617; G05D 1/65; G05D 1/81; G05D 2105/24; G05D 2107/13; G05D 2107/17; G05D 2109/10; G08G 1/0112; G08G 1/0133; G08G 1/09626; G06V 20/588
See application file for complete search history.

(56) References Cited

U.S. PATENT DOCUMENTS 9,576,480 B1 2/2017 Shoshan
10,403,133 B1 9/2019 Christensen
10,915,762 B1 2/2021 Russell
11,454,510 B1 9/2022 Gray et al.
11,485,345 B2 11/2022 Kuroda et al.
12,208,806 B2 1/2025 Zhou
12,240,479 B2 3/2025 Matsunaga et al.
12,403,903 B2 9/2025 Matsunaga et al.
2007/0208483 A1 9/2007 Rabin
2009/0228175 A1* 9/2009 Borgesson ............. B60K 35/22 701/48
2010/0114468 A1 5/2010 Field et al.
2011/0210867 A1 9/2011 Benedikt
2012/0203424 A1* 8/2012 Filev ..................... B60W 50/00 701/36
2013/0226431 A1 8/2013 Lu et al.
2015/0025769 A1* 1/2015 Franganillo ............ B60K 31/00 701/93
2015/0332114 A1 11/2015 Springer
2016/0214675 A1 7/2016 DeCordova
2018/0012196 A1 1/2018 Ricci et al.
2018/0022349 A1* 1/2018 Fairgrieve ............ B22D 21/005 701/93
2018/0046196 A1 2/2018 Hashimoto et al.
2019/0061749 A1 2/2019 Fukumoto et al.
2019/0101916 A1 4/2019 Sen et al.
2019/0111925 A1 4/2019 Sata
2019/0144000 A1 5/2019 Hennes et al.
2019/0220008 A1* 7/2019 Mizuno ................ G05D 1/0088
2019/0248439 A1 8/2019 Wang
2019/0375427 A1 12/2019 Whitt et al.
2019/0383627 A1* 12/2019 Nangeroni ........ B60W 50/0098
2020/0086846 A1 3/2020 Kuroda et al.
2020/0124430 A1* 4/2020 Bradlow ................ B62J 45/412
2020/0198658 A1 6/2020 Suzuki et al.
2020/0290643 A1 9/2020 Ueda et al.
2020/0341470 A1 10/2020 Maeda et al.
2020/0398923 A1 12/2020 Griffith et al.
2020/0410256 A1 12/2020 Bayer et al.
2021/0001889 A1 1/2021 Furukawa
2021/0034156 A1* 2/2021 Drayna .................. B62K 5/007
2021/0064030 A1 3/2021 Jiang et al.
2021/0110716 A1 4/2021 Becker et al.
2021/0165404 A1 6/2021 Gillett
2021/0188225 A1 6/2021 Van Hoecke et al.
2021/0191424 A1 6/2021 Drayna et al.
2021/0197712 A1 7/2021 Korjus et al.
2021/0310820 A1 10/2021 Park et al.
2022/0036747 A1 2/2022 Ortman
2022/0044551 A1* 2/2022 Sheckler .............. G08G 1/0965
2023/0245223 A1 8/2023 Okai
2023/0249716 A1 8/2023 Oguro et al.
2023/0375347 A1 11/2023 Nimura
2024/0326869 A1 10/2024 Carroll
2024/0404404 A1 12/2024 Rouhi
2025/0390114 A1 12/2025 Kim et al.

FOREIGN PATENT DOCUMENTS

CN 111133489 5/2020
CN 112141124 12/2020
CN 110920613 1/2025
DE 102018206044 A1 * 10/2019 ............ B60W 10/04
EP 0403977 12/1990
EP 2045178 4/2009
EP 2969634 3/2020
JP 03-155859 7/1991
JP 2009-089758 4/2009
JP 2010-086269 4/2010
JP 2011-016615 1/2011
JP 2011-075474 4/2011
JP 2014-039772 3/2014
JP 2015-186321 10/2015
JP 2016-212120 12/2016
JP 2017-100490 6/2017
JP 2018-036134 3/2018
JP 2019-197328 11/2019
JP 2020-121573 8/2020
JP 2020-185889 11/2020
JP 2020-189536 11/2020
JP 2020-189537 11/2020
WO 2021/230236 11/2021

OTHER PUBLICATIONS

European Search Report for European Patent Application No. 22935126.7 mailed Apr. 2, 2025.
International Search Report and Written Opinion for International Application No. PCT/JP2022/015417 mailed on May 31, 2022, 8 pages.
International Search Report and Written Opinion for International Application No. PCT/JP2022/015796 mailed on Jun. 21, 2022, 9 pages.
European Search Report fro European Patent Application No. 22935207.5 mailed Apr. 7, 2025.
Non-Final Office Action for U.S. Appl. No. 18/851,102 mailed Dec. 17, 2025.
Japanese Office Action for Japanese Patent Application No. 2021-056995 mailed May 21, 2024.
Non-Final Office Action for U.S. Appl. No. 17/702,847 mailed Mar. 6, 2024.
Chinese Office Action for Chinese Patent Application No. 202210154533.X mailed Nov. 26, 2024.
U.S. Notice of Allowance for U.S. Appl. No. 18/851,102 mailed Apr. 17, 2026.

* cited by examiner

ROAD SURFACE BASED MOBILE OBJECT TRAVEL STATE CONTROLLER

TECHNICAL FIELD

The present invention relates to a device for controlling a mobile object, a method for controlling a mobile object, and a storage medium.

BACKGROUND ART

In recent years, there has been progress in practical applications of mobile objects that can move on both sidewalks and roadways. In connection with this, a technique of detecting a direction in which an electromotive vehicle can move from an image of a block for guiding a visually impaired person included in image data captured by an image capturer and controlling travel of the electromotive vehicle on the basis of the detected direction is disclosed (see, for example, Patent Document 1).

CITATION LIST

Patent Document

Patent Document 1

Japanese Unexamined Patent Application, First Publication No. 2019-197328

SUMMARY OF INVENTION

Technical Problem

Incidentally, mobile objects that can move on both sidewalks and roadways need to be moved in different travel states with different upper limit speeds set for sidewalks and roadways, but in situations where it is difficult to recognize the type of road, the system side may misrecognize the type of road, which may cause the mobile object to move in the wrong travel state. However, in the related art, traveling control in situations like that described above is not taken into account, and there are cases in which appropriate traveling control cannot be performed in accordance with the road conditions.

The present invention was contrived in view of such circumstances, and one object thereof is to provide a device for controlling a mobile object, a method for controlling a mobile object, and a storage medium that make it possible to move a mobile object in a more appropriate travel state in accordance with the road conditions during movement.

Solution to Problem

The following configurations are adopted in a device for controlling a mobile object, a method for controlling a mobile object, and a storage medium according to this invention.

(1) According to an aspect of this invention, there is provided a device for controlling a mobile object which one or more occupants are on board and which is movable both on a roadway and in a predetermined region different from the roadway, the device including: a road type recognizer configured to recognize which type of road the mobile object is moving on, out of the roadway and the predetermined region, on the basis of an output of an external detection device that detects an outside situation of the mobile object;

and a controller configured to move the mobile object in either a first travel state in which a speed of the mobile object is limited to a first speed or a second travel state in which the speed of the mobile object is limited to a second speed lower than the first speed on the basis of the road type recognized by the road type recognizer, wherein the controller moves the mobile object in the first travel state in a case where it is recognized that the mobile object is moving on the roadway, moves the mobile object in the second travel state in a case where it is recognized that the mobile object is moving in the predetermined region, and forcibly switches the travel state under control even in a case where it is recognized that the mobile object is moving on the roadway or in the predetermined region when an operation for switching the travel state is performed by a switching operation unit that accepts a switching operation of the travel state performed by the occupant.

(2) In the aspect of the above (1), in a case where the travel state is switched on the basis of the switching operation performed by the switching operation unit, the controller notifies the occupant and/or surroundings of the mobile object of information indicating that the travel state has been forcibly switched.

(3) In the aspect of the above (1), in a case where the travel state is switched on the basis of the switching operation performed by the switching operation unit, the controller notifies the occupant and/or surroundings of the mobile object of information indicating which of the first travel state and the second travel state the mobile object is moving in.

(4) In the aspect of the above (1), the controller makes a notification mode in a case of notification of the travel state switched by the switching operation of the switching operation unit different from that in a case of notification of the travel state determined on the basis of the road type recognized by the road type recognizer.

(5) In the aspect of the above (1), the controller moves the mobile object in any of a plurality of driving modes which are set in advance, and does not switch the travel state based on the switching operation performed by the switching operation unit in a case where the driving mode being executed is a specific driving mode.

(6) In the aspect of the above (1), the controller does not switch the travel state based on the switching operation performed by the switching operation unit in a case where a degree of recognition of the road type recognized by the road type recognizer is equal to or greater than a threshold.

(7) In the aspect of the above (1), the controller notifies an external device of information on a position of the mobile object in a case where the switching operation of the travel state is performed by the switching operation unit.

(8) According to another aspect of the present invention, there is provided a method for controlling a mobile object, including causing a computer that controls a mobile object which one or more occupants are on board and which is movable both on a roadway and in a predetermined region different from the roadway to: recognize which type of road the mobile object is moving on, out of the roadway and the predetermined region, on the basis of an output of an external detection device that detects an outside situation of the mobile object; move the mobile object in either a first travel state in which a speed of the mobile object is limited to a first speed or a second travel state in which the speed of the mobile object is limited to a second speed lower than the first speed on the basis of the recognized road type; move the mobile object in the first travel state in a case where it is recognized that the mobile object is moving on the roadway; move the mobile object in the second travel state in a case where it is recognized that the mobile object is moving in the predetermined region; and forcibly switch the travel state under control even in a case where it is recognized that the mobile object is moving on the roadway or in the predetermined region when an operation for switching the travel state is performed by a switching operation unit that accepts a switching operation of the travel state performed by the occupant.

(9) According to another aspect of the present invention, there is provided a storage medium having a program stored therein, the program causing a computer that controls a mobile object which one or more occupants are on board and which is movable both on a roadway and in a predetermined region different from the roadway to: recognize which type of road the mobile object is moving on, out of the roadway and the predetermined region, on the basis of an output of an external detection device that detects an outside situation of the mobile object; move the mobile object in either a first travel state in which a speed of the mobile object is limited to a first speed or a second travel state in which the speed of the mobile object is limited to a second speed lower than the first speed on the basis of the recognized road type; move the mobile object in the first travel state in a case where it is recognized that the mobile object is moving on the roadway; move the mobile object in the second travel state in a case where it is recognized that the mobile object is moving in the predetermined region; and forcibly switch the travel state under control even in a case where it is recognized that the mobile object is moving on the roadway or in the predetermined region when an operation for switching the travel state is performed by a switching operation unit that accepts a switching operation of the travel state performed by the occupant.

Advantageous Effects of Invention

According to the aspects of the above (1) to (9), it is possible to move the mobile object in a more appropriate travel state in accordance with the road conditions during movement.

DESCRIPTION OF EMBODIMENTS

Hereinafter, an embodiment of a device for controlling a mobile object, a method for controlling a mobile object, and a storage medium according to the present invention will be described with reference to the accompanying drawings. The mobile object is an object that moves both on a roadway and in a predetermined region different from the roadway. The mobile object is sometimes referred to as a micromobility. An electric scooter is a type of micromobility. The predetermined region is, for example, a sidewalk. In addition, the predetermined region may be any or all of a roadside strip, a bicycle lane, an open space, and the like, or may include all of a sidewalk, a roadside strip, a bicycle lane, an open space, and the like. In the following description, the predetermined region is assumed to be a sidewalk. In the following description, the portion described as a "sidewalk" can be appropriately replaced with a "predetermined region."

Figure 1:
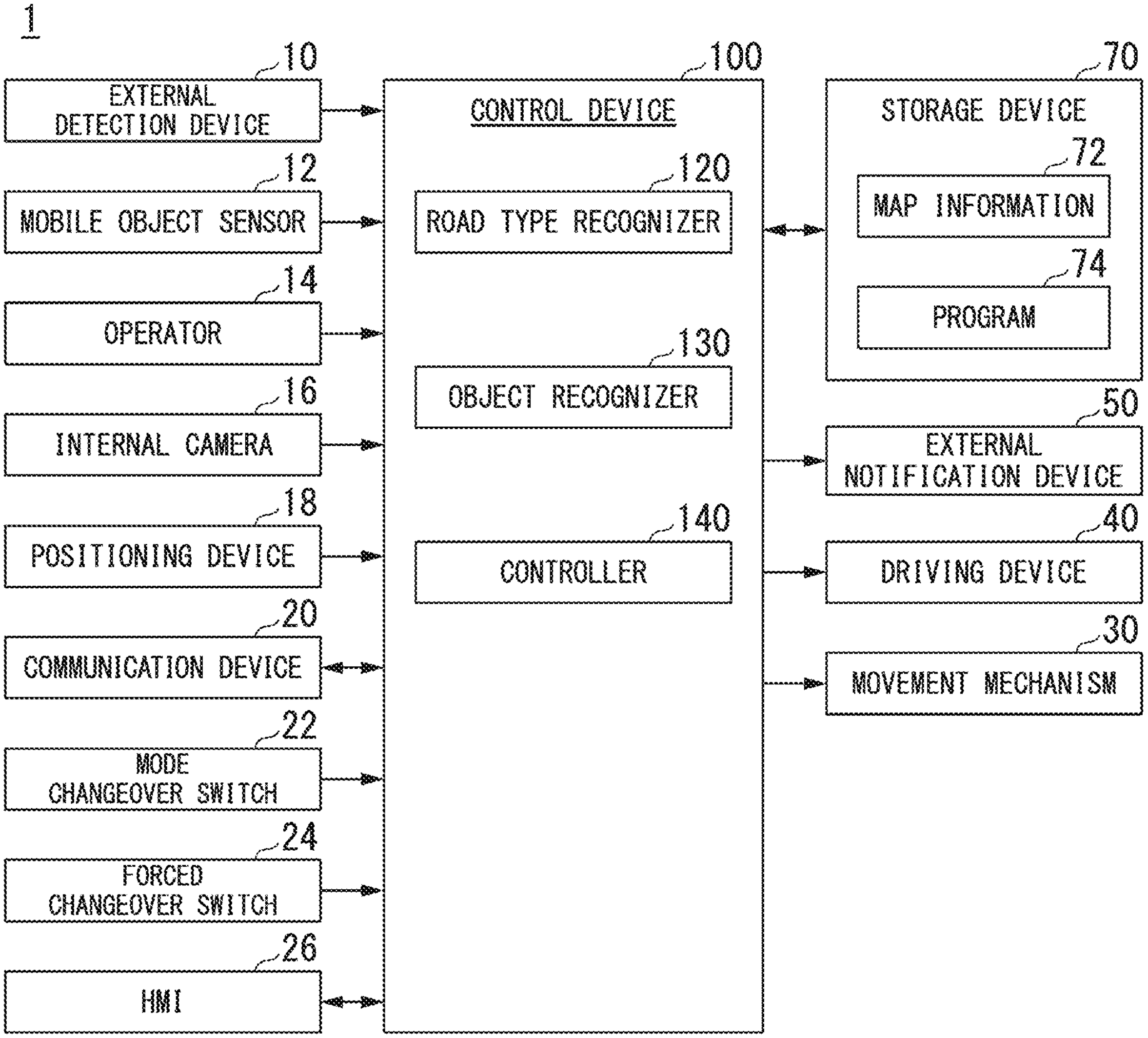
FIG. 1 is a diagram illustrating an example of a configuration of a mobile object 1 and a control device 100 according to an embodiment.

FIG. 1 is a diagram illustrating an example of a configuration of a mobile object 1 and a control device 100 according to an embodiment. The mobile object 1 is equipped with, for example, an external detection device 10, a mobile object sensor 12, an operator 14, an internal camera 16, a positioning device 18, a communication device 20, a mode changeover switch 22, a forced changeover switch 24, a human machine interface (HMI) 26, a movement mechanism 30, a driving device 40, an external notification device 50, a storage device 70, and a control device 100. Meanwhile, some of these components which are not essential for realizing the functions of the present invention may be omitted.

The external detection device 10 detects the outside situation of the mobile object 1. For example, the external detection device 10 is a variety of devices of which the detection range includes at least a portion of the periphery of the mobile object 1 (including the direction of travel). The external detection device 10 includes an external camera, a radar device, a light detection and ranging (LIDAR), a sensor fusion device, and the like. The external detection device 10 outputs information indicating the detection result (such as an image or the position of an object) to the control device 100.

The mobile object sensor 12 includes, for example, a speed sensor, an acceleration sensor, a yaw rate (angular velocity) sensor, an orientation sensor, an operation amount detection sensor attached to the operator 14, and the like.

The operator 14 accepts a driving operation performed by an occupant of a mobile object. The operator 14 includes, for example, an operator for indicating acceleration or deceleration (for example, an accelerator pedal, a brake pedal, a dial switch or a lever for speed adjustment) and an operator for indicating steering (for example, a steering wheel). In this case, the mobile object sensor 12 may include an accelerator position sensor, a brake stepping amount sensor, a steering torque sensor, and the like. The mobile object 1 may include other forms of operators (such as, for example, a non-circular rotary operator, a joystick, or a button) as the operator 14.

The internal camera 16 captures an image of at least the front head of the occupant of the mobile object 1. The internal camera 16 is a digital camera using an imaging element such as a charge coupled device (CCD) or a complementary metal oxide semiconductor (CMOS). The internal camera 16 outputs the captured image to the control device 100.

The positioning device 18 is a device that measures the position of the mobile object 1. The positioning device 18 is, for example, a global navigation satellite system (GNSS) receiver, and specifies the position of the mobile object 1 on the basis of a signal received from a GNSS satellite and outputs it as position information. Meanwhile, information on the position of the mobile object 1 may be estimated from the position of a Wi-Fi base station to which the communication device 20 is connected.

The communication device 20 communicates with another mobile object in the vicinity using, for example, a cellular network, a Wi-Fi network, Bluetooth (registered trademark), dedicated short range communication (DSRC), or the like, or communicates with various external devices (for example, management servers) through a wireless base station.

The mode changeover switch 22 is a switch operated by an occupant. The mode changeover switch 22 may be a mechanical switch, or may be a graphical user interface (GUI) switch which is set on the touch panel of the HMI 26. The mode changeover switch 22 accepts, for example, an operation for switching the driving mode to any of a mode A: an assistance mode in which one of a steering operation and acceleration or deceleration control is performed by the occupant and the other is automatically performed, which may include a mode A-1 in which a steering operation is performed by the occupant and acceleration or deceleration control is automatically performed and a mode A-2 in which an acceleration or deceleration operation is performed by the occupant and steering control is automatically performed, a mode B: a manual driving mode in which a steering operation and an acceleration or deceleration operation are performed by the occupant, and a mode C: an automated driving mode in which operation control and acceleration or deceleration control are automatically performed.

The forced changeover switch 24 is a switch that accepts a forced switching operation of the travel state of the mobile object 1 or an operation for canceling the switching, which will be described later. The forced changeover switch 24 may be a mechanical switch, or may be a GUI switch which is set on the touch panel of the HMI 26. The forced changeover switch 24 is an example of a "switching operation unit." The switching operation unit may include the mode changeover switch 22.

Meanwhile, the above-described operation for switching the mode or travel state may be accepted from a microphone or the internal camera 16 provided in the mobile object 1 instead of the mode changeover switch 22 or the forced changeover switch 24. In this case, the control device 100 may accept a switching operation of the mode or travel state from the analysis result of the occupant's voice input by the microphone, or may accept a switching operation of the mode or travel state from the occupant's gestures, mouth movements, and the like obtained as the result of analysis of the occupant's front image captured by the internal camera 16.

The HMI 26 presents (reports or notifies of) various types of information to the occupant of the mobile object 1 and accepts an input operation performed by the occupant. The HMI 26 includes various display devices, speakers, microphones, buzzers, touch panels, switches, keys, lamps, and the like. The HMI 26 is an example of an "internal notification device." For example, the HMI 26 notifies the occupant of the travel state of the mobile object 1 controlled by a controller 140 in different notification modes depending on the difference in the travel state. In addition, the HMI 26 presents, for example, information from the control device 100, or presents information acquired from an external device by the communication device 20.

The movement mechanism 30 is a mechanism for moving the mobile object 1 on the road. The movement mechanism 30 is, for example, a wheel group including a steering wheel and a driving wheel. In addition, the movement mechanism 30 may be a leg section for walking on multiple legs.

The driving device 40 outputs force to the movement mechanism 30 to move the mobile object 1. For example, the driving device 40 includes a motor that drives the driving wheels, a battery that stores electric power to be supplied to the motor, a steering device that adjusts the steering angle of the steering wheel, and the like. The driving device 40 may include an internal-combustion engine, a fuel cell, or the like as a driving force output means or a power generation means. In addition, the driving device 40 may further include a brake device using frictional force or air resistance.

The external notification device 50 is, for example, a lamp, a display device, a speaker, or the like provided on the outer panel of the mobile object 1 to notify the outside of the mobile object 1 of information. The external notification device 50 notifies, for example, the surroundings of the mobile object (within a predetermined distance from the mobile object 1) of the travel state of the mobile object 1 controlled by the controller 140 in different notification modes depending on the difference in the travel state.

Figure 2:
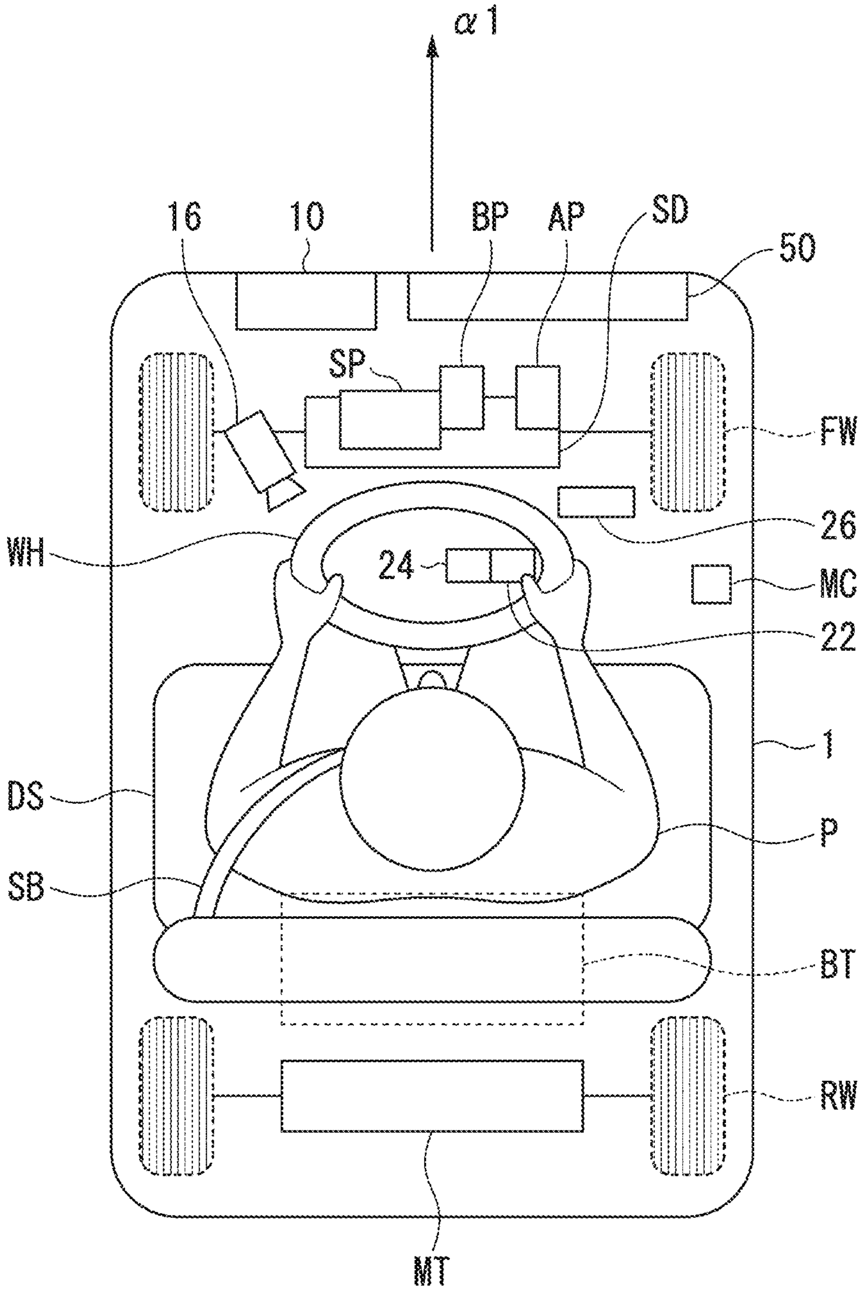
FIG. 2 is a perspective view of the mobile object 1 from above.

FIG. 2 is a perspective view of the mobile object 1 from above. In the drawing, FW is a steering wheel, RW is a driving wheel, SD is a steering device, MT is a motor, and BT is a battery. The steering device SD, the motor MT, and the battery BT are included in the driving device 40. In addition, AP is an accelerator pedal, BP is a brake pedal, WH is a steering wheel, SP is a speaker, and MC is a microphone. The mobile object 1 shown in the drawing is a one-person mobile object, and an occupant P is seated in the driver's seat DS and wearing a seat belt SB. Arrow al is the traveling direction (velocity vector) of the mobile object 1. The external detection device 10 is provided near the front end of the mobile object 1, the internal camera 16 is provided at a position where the head of the occupant P can be imaged from the front of the occupant P, and the mode changeover switch 22 or the forced changeover switch 24 is provided at the boss portion of the steering wheel WH. In addition, the external notification device 50 serving as a display device is provided near the front end of the mobile object 1. In addition, the HMI 26 serving as a display device is provided in front of the occupant P inside the mobile object. The external notification device 50 may be formed integrally with the speaker SP, and the HMI 26 may be formed integrally with the speaker SP and the microphone MC.

Referring back to FIG. 1, the storage device 70 is a non-transitory storage device such as, for example, a hard disk drive (HDD), a flash memory, or a random access memory (RAM). The storage device 70 stores map information 72, a program 74 executed by the control device 100, and the like. Although the storage device 70 is shown outside the frame of the control device 100 in the drawing, the storage device 70 may be included in the control device 100.

[Control Device]

The control device 100 includes, for example, a road type recognizer 120, an object recognizer 130, and the controller 140. For example, it is realized by a hardware processor such as a central processing unit (CPU) executing the program (software) 74. Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in the storage device 70 in advance, may be stored in a detachable storage medium (non-transitory storage medium) such as a DVD or a CD-ROM, or may be installed in the storage device 70 by the storage medium being mounted in a drive device.

The road type recognizer 120 recognizes whether the mobile object 1 is moving on a roadway or moving on a sidewalk. For example, the road type recognizer 120 recognizes which type of road the mobile object 1 is moving on, for example, a roadway or a sidewalk, by analyzing an image captured by an external camera of the external detection device 10. Meanwhile, the output of the radar device, the LIDAR, the sensor fusion device, and the like may be used as an auxiliary.

An example of image analysis is semantic segmentation. The road type recognizer 120 classifies each pixel in the frame of the image into classes (roadways, sidewalks, boundaries such as road partition lines, obstacles, and the like) and assigns labels to them, recognizes that the mobile object 1 is moving on a roadway in a case where there are many pixels to which a roadway label is assigned in a region equivalent to the front of the mobile object 1, and recognizes that the mobile object 1 is moving on a sidewalk in a case where there are many pixels to which a sidewalk label is assigned in a region equivalent to the front of the mobile object 1 in the image. Without being limited to this, the road type recognizer 120 may recognize that the mobile object 1 is moving on a roadway in a case where a vehicle is recognized in a region equivalent to the front of the mobile object 1 in the image, and recognize that the mobile object 1 is moving on a sidewalk in a case where a pedestrian is recognized in a region equivalent to the front of the mobile object 1 in the image. In addition, the road type recognizer 120 may recognize that the mobile object 1 is moving on a roadway in a case where the width of the road surface region in the region equivalent to the front of the mobile object 1 in the image is large, and recognize that the mobile object 1 is traveling on a sidewalk in a case where the width of the road surface region in the region equivalent to the front of the mobile object 1 in the image is small.

In addition, the road type recognizer 120 may collate information on the position of the mobile object 1 obtained by the positioning device 18 with the map information 72 to recognize whether the mobile object 1 is moving on a roadway or moving on a sidewalk. The map information in this case needs to have enough accuracy to distinguish between a sidewalk and a roadway from the position coordinates. In addition, in a case where the "predetermined region" is not only a sidewalk, the road type recognizer 120 performs the same process for roadside strips, bicycle lanes, open spaces, and the like.

In addition, the road type recognizer 120 may acquire the degree of recognition of the recognized road type. The degree of recognition is an index value indicating the certainty (likelihood) of being the recognized road type, and indicates that as the degree of recognition becomes higher, it is more likely that the actual road type and the recognized road type are the same as each other. The degree of recognition varies depending on, for example, performance degradation (for example, deterioration or failure) caused by the external detection device 10, the surrounding environment (dirt or scratches on road partition lines, weather, road shape), and the like. For example, the degree of recognition is derived on the basis of the degree of match between the road type recognized from the image captured by the external camera of the external detection device 10 and the reference road type. In addition, instead of (or in addition to) the above degree of match, the degree of recognition may be derived on the basis of the degree of match between the road type recognized from the image captured by the external camera and information on the partition line recognized by LIDAR, or the degree of match between the road type recognized from the image and the road type included in the map information.

The object recognizer 130 recognizes objects existing around the mobile object 1 (for example, within a predetermined distance from the mobile object 1) on the basis of the output of the external detection device 10. Examples of the objects include some or all of a moving object such as a vehicle, a bicycle, or a pedestrian, a driving boundary such as a road partition line, a step difference, a guardrail, a shoulder, or a median strip, a structure installed on a road such as a road mark or a signboard, and an obstacle such as a fallen object present (dropped) on a runway. In addition, the object recognizer 130 may recognize a step difference or a groove existing between (at the boundary of) a roadway and a sidewalk. The object recognizer 130 acquires, for example, information such as the presence, position, and type of another mobile object by inputting the image captured by the external camera into a trained model that has been trained to output information such as the presence, position, and type of an object when the image captured by the external camera of the external detection device 10 is input. The type of another mobile object can also be estimated on the basis of the size in the image, the intensity of the reflected waves received by the radar device of the external detection device 10, and the like. In addition, the object recognizer 130 may recognize, for example, the speed of another mobile object detected by the radar device using Doppler shift or the like.

The controller 140 controls, for example, the driving device 40 in accordance with a driving mode determined by the mode changeover switch 22 or the like among a plurality of driving modes set in advance. Meanwhile, the mobile object 1 may execute only some of the driving modes described below, but in either case, the controller 140 makes, in principle, the travel state different in a case where the mobile object 1 moves on a roadway and a case it moves on a sidewalk. In that case, the mode changeover switch 22 may be omitted. The travel state includes at least state information relating to the speed limit value. The travel state includes, for example, at least a first travel state and a second travel state. The first travel state is, in principle, a travel state in a case where the mobile object 1 moves on a roadway, and the upper limit speed of the mobile object 1 is limited to a first speed. The second travel state is, in principle, a travel state in a case where the mobile object 1 moves on a sidewalk, and the upper limit speed of the mobile object 1 is limited to a second speed lower than the first speed.

For example, in the mode A-1, in a case where it is recognized that the mobile object 1 is moving on a roadway by referring to information on the runway and object based on the outputs of the road type recognizer 120 and the object recognizer 130, the controller 140 controls the motor MT of the driving device 40 so that the travel state is switched to the first travel state to maintain the distance to an object in front of the mobile object 1 at a certain value or more, and that the mobile object 1 moves at the first speed V1 (for example, a speed of ten [km/h] or higher and lower than several tens [km/h]) when the distance to the object in front of the mobile object 1 is sufficiently long. In addition, in a case where it is recognized that the mobile object 1 is moving on a sidewalk, the controller 140 controls the motor MT of the driving device 40 so that the travel state is switched to the second travel state to maintain the distance to the object in front of the mobile object 1 at a certain value or more, and that the mobile object 1 moves at the second speed V2 (for example, a speed of lower than ten [km/h]) when the distance to the object in front of the mobile object 1 is sufficiently long. Such a function is similar to the adaptive cruise control (ACC) function of a vehicle with the first speed V1 or the second speed V2 as a set speed, and a technique used in ACC can be used. In addition, in the mode A-1, the controller 140 controls the steering device SD so as to change the steering angle of the steering wheel on the basis of the amount of operation of the operator 14 such as the steering wheel. Such a function is similar to the function of a power steering device, and a technique used in the power steering device can be used. Meanwhile, the mobile object 1 may have a steering device in which the operator 14 and a steering mechanism are mechanically connected to each other without electronically controlling the steering.

In the mode A-2, the controller 140 refers to information on the runway and object based on the outputs of the road type recognizer 120 and the object recognizer 130, generates a target trajectory that can be moved while avoiding an object within the runway, and controls the steering device SD of the driving device 40 so that the mobile object 1 moves along the target trajectory. Regarding acceleration or deceleration, the controller 140 controls the motor MT of the driving device 40 on the basis of the speed of the mobile object 1 and the amount of operation of the accelerator pedal or the brake pedal. In a case where it is recognized that the mobile object 1 is moving on a roadway, the controller 140 switches the travel state to the first travel state to control the motor MT of the driving device 40 with the first speed V1 as the upper limit speed (in the case of the mode A-2, reaching the upper limit speed means that the mobile object 1 will not be accelerated even if there is a further acceleration instruction), and in a case where it is recognized that the mobile object 1 is moving on a sidewalk, the controller switches the travel state to the second travel state to control the driving device 40 with the second speed V2 as the upper limit speed.

In the mode B, the controller 140 controls the motor MT of the driving device 40 on the basis of the speed of the mobile object 1 and the amount of operation of the accelerator pedal or the brake pedal. In a case where it is recognized that the mobile object 1 is moving on a roadway, the controller 140 switches the travel state to the first travel state to control the motor MT of the driving device 40 with the first speed V1 as the upper limit speed (in the case of the mode B, reaching the upper limit speed means that the mobile object 1 will not be accelerated even if there is a further acceleration instruction), and in a case where it is recognized that the mobile object 1 is moving on a sidewalk, the controller switches the travel state to the second travel state to control the motor MT of the driving device 40 with the second speed V2 as the upper limit speed. As for the steering, it is similar to the mode A-1.

In the mode C, the controller 140 refers to the information on the runway and object based on the output off the object recognizer 130, generates a target trajectory that can be moved while avoiding an object within the runway, and controls the driving device 40 so that the mobile object 1 moves along the target trajectory. In the mode C, in a case where it is recognized that the mobile object 1 is moving on a roadway, the controller 140 also switches the travel state to the first travel state to control the driving device 40 with the first speed V1 as the upper limit speed, and in a case where it is recognized that the mobile object 1 is moving on a sidewalk, the controller switches the travel state to the second travel state to control the driving device 40 with the second speed V2 as the upper limit speed.

In addition, for example, in a case where the switching operation of the travel state is accepted from the occupant P by the forced changeover switch 24 (in a case where the switching operation is performed by the occupant P), the controller 140 may switch the travel state, which is controlled on the basis of the results of recognition performed by the road type recognizer 120 and the object recognizer 130, on the basis of the switching operation performed by the occupant P.

Hereinafter, the switching of the travel state in the controller 140 and the content of notification to the occupant and/or the surroundings of the mobile object 1 based on the travel state will be described in detail.

[Switching of Travel State]

Figure 3:
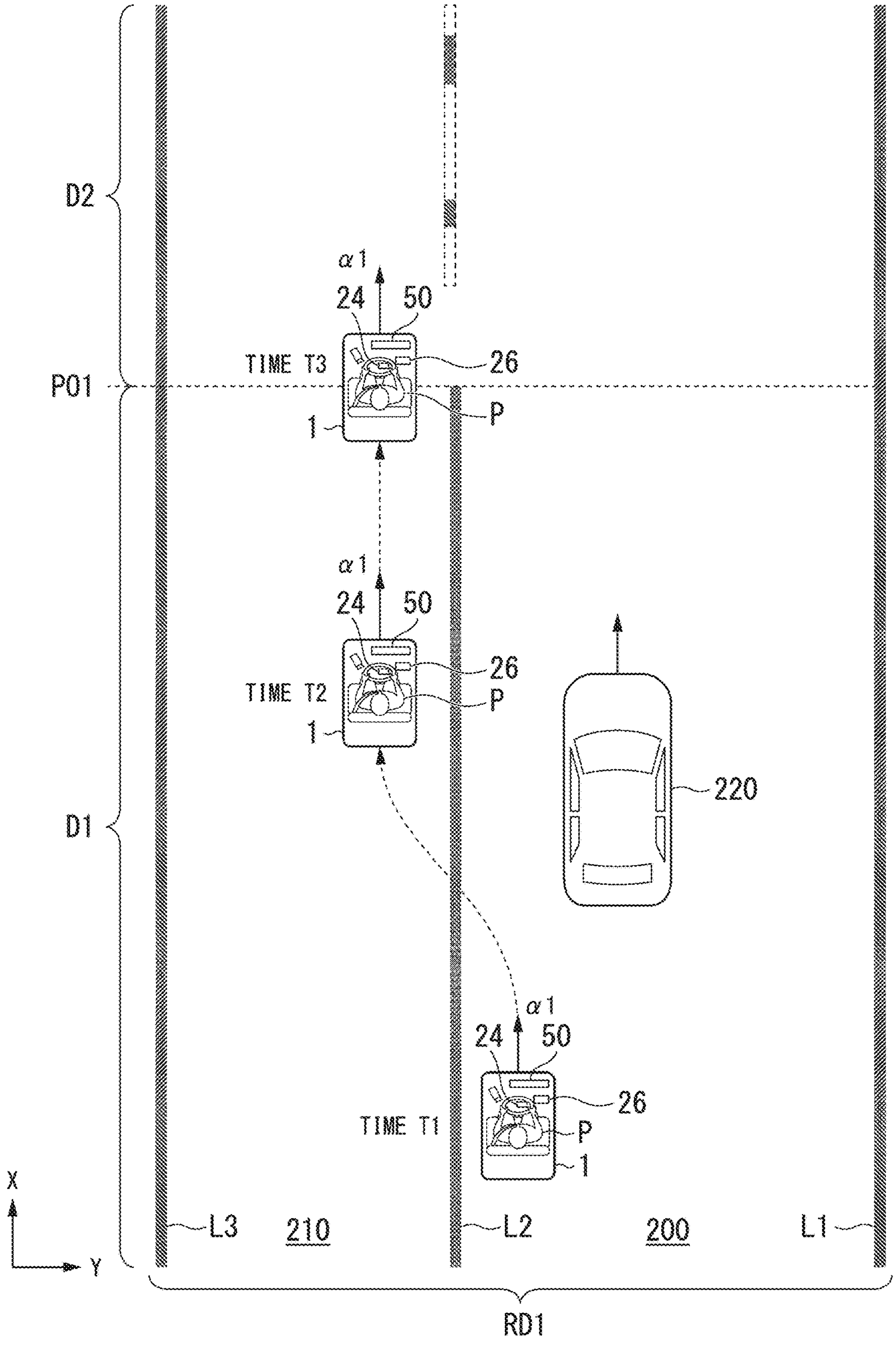
FIG. 3 is a diagram illustrating the content of control of the mobile object 1 in a controller 140.

FIG. 3 is a diagram illustrating the content of control of the mobile object 1 in the controller 140. In the example of FIG. 3, a road RD1 including a roadway 200 and a sidewalk 210 is shown. In addition, in FIG. 3, the road RD1 is partitioned by road partition lines L1 and L3, the roadway 200 is further partitioned by road partition lines L1 and L2, and the sidewalk 210 is partitioned by road partition lines L2 and L3. The road RD1 is assumed to extend in the X-axis direction in the drawing, and the mobile object 1 and a vehicle 220 are assumed to be moving in the extending direction. In addition, in FIG. 3, time T1 is the earliest, followed by T2 and T3 in this order. In addition, the example of FIG. 3 shows the position and traveling direction of the mobile object 1 at each time. In addition, in the example of FIG. 3, it is assumed that the system side (the road type recognizer 120, the object recognizer 130) can recognize the road partition line L2 in a section D1 of the road RD1 until reaching a road point (position in the X-axis direction) PO1, but the system side cannot recognize the road partition line L2 in a section D2 ahead of the point PO1 due to dirt, scratches, or the like on the road partition line L2.

At time T1, the mobile object 1 is moving along the roadway 200 of the road RD1 in the extending direction. In this case, the road type recognizer 120 recognizes that the type of road on which the mobile object 1 is currently moving is the roadway 200. Since the road type recognizer 120 recognizes that the mobile object 1 is moving on the roadway 200, the controller 140 performs control for moving the mobile object 1 in the first travel state.

In the example of FIG. 3, the mobile object 1 is moving from the roadway 200 to the sidewalk 210 between times T1 and T2. At time T2, the road type recognizer 120 recognizes that the type of road on which the mobile object 1 is traveling is the roadway 200. Since the road type recognizer 120 recognizes that the mobile object 1 is moving on the sidewalk 210, the controller 140 moves the mobile object 1 in the second travel state. Meanwhile, in a case where the reference position (for example, the center of gravity) of the mobile object 1 and the entire mobile object 1 are present on the sidewalk 210 beyond the road partition line L2 from the roadway 200 (or in a case where a predetermined time has elapsed after it was determined that the mobile object is present on the sidewalk 210), the controller 140 may switch the first travel state to the second travel state.

Time T3 is a time at which the mobile object 1 is moving on the sidewalk 210, and indicates a time at which the mobile object T1 which is traveling in the extending direction of the road RD1 crosses the road point PO1. At time T3, the road type recognizer 120 is assumed to recognize that the type of road on which the mobile object 1 is traveling is the roadway 200 on the basis of the road partition lines L1 and L3 because the road partition line L2 has not been recognized. In this case, since the road type recognizer 120 recognizes that the mobile object 1 is moving on the roadway 200, the controller 140 switches the second travel state to the first travel state to move the mobile object 1. However, since the mobile object 1 is actually traveling on the sidewalk 210, the occupant P uses the forced changeover switch 24 to perform an operation for forcibly switching to the second travel state. The controller 140 performs control for forcibly switching the travel state of the mobile object 1 from first travel state to the second travel state on the basis of the switching operation (instruction) accepted by the forced changeover switch 24.

This makes it possible for the occupant P to switch the travel state of the mobile object 1 at his or her will even in a case where the system side misrecognizes the type of road on which the mobile object 1 is traveling, and thus it is possible to execute more appropriate traveling control in accordance with the road conditions during movement.

Meanwhile, the forced switching control of the travel state is continued, for example, until an operation for canceling the switching is accepted by the forced changeover switch 24. In addition, the forced switching control may be continued until a predetermined time has elapsed after the switching control was executed and/or until the mobile object 1 has traveled a predetermined distance. This makes it possible to suppress frequent switching of the travel state and to realize more stable traveling control.

In addition, in a case where the degree of recognition of the road type in the road type recognizer 120 is equal to or greater than a threshold, the controller 140 may not switch the traveling control based on the operation accepted by the forced changeover switch 24. For example, in the example of FIG. 3, in the section D1, since the road partition lines L1 to L3 can be recognized, the degree of recognition of the road type is equal to or greater than the threshold. On the other hand, in the section D2, since the road partition line L2 cannot be recognized, the degree of recognition of the road type decreases and becomes less than the threshold. Therefore, the controller 140 does not switch the traveling control based on the operation accepted by the forced changeover switch 24 in the section D1, and switches the traveling control based on the operation accepted by the forced changeover switch 24 in the section D2. In addition, the controller 140 may forcibly perform the traveling control corresponding to the instruction accepted by the forced changeover switch 24 only while the degree of recognition is less than the threshold, terminate the above traveling control in a case where the degree returns to the threshold or more, and switch to traveling control based on the recognition result of the road type.

[Content of Notification]

Next, the content of notification to the occupant P (inside the mobile object 1) and the surroundings (outside the mobile object 1) based on the travel state of the mobile object 1 will be described in detail. The controller 140 notifies the occupant P and/or the surroundings of information relating to the travel state in different notification modes for each travel state of the mobile object 1. In addition, the controller 140 may make the notification mode in the case of notification of the travel state switched by the switching operation of the forced changeover switch 24 different from that in the case of notification of the travel state determined on the basis of the road type recognized by the road type recognizer 120. Examples of the notification mode include lighting, blinking, and color of a lamp, text, font, and graphics displayed on a display device, audio of a speaker, an alarm, and the like.

For example, the controller 140 performs control for causing the lamp of the external notification device 50 not to emit light in a case where the mobile object 1 is moving on a roadway in the first travel state, and causing the lamp of the external notification device 50 to emit light in a case where the mobile object 1 is moving on a sidewalk in the second travel state. The color of light emitted from this lamp is preferably a color specified by law. In addition, the controller 140 may perform control for causing the lamp to emit blue light in a case where the road type recognizer 120 recognizes that the mobile object 1 is moving on the roadway 200, and causing the lamp to emit green light in a case where it is recognized that the mobile object is moving on the sidewalk 210. Further, the controller 140 may perform control for causing the lamp to light up or blink in red (different color from normal) in a case where the mobile object 1 is traveling in a travel state according to the switching operation accepted by the forced changeover switch 24. Meanwhile, the controller 140 may control the notification mode by the lamp so that the mode differs for each travel state according to the switching operation.

In addition, in a case where the HMI 26 and the external notification device 50 include a display device, the controller 140 causes the HMI 26 and the external notification device 50 to display information indicating that the mobile object 1 is moving on the roadway 200 in text or graphics when the road type recognizer 120 recognizes that the mobile object is moving on the roadway. Further, in a case where the road type recognizer 120 recognizes that the mobile object 1 is moving on the sidewalk 210, the controller 140 causes the HMI 26 and the external notification device 50 to display information indicating that the mobile object is moving on the sidewalk in in text or graphics. In addition, the controller 140 may cause the HMI 26 and the external notification device 50 to display information indicating that the mobile object 1 is moving in the first travel state or moving in the second travel state in text or graphics. Further, the controller 140 may cause the HMI 26 and the external notification device 50 to display information indicating that the mobile object 1 is forcibly traveling in the travel state according to the switching operation accepted by the forced changeover switch 24 in text or graphics.

In addition, in a case where the HMI 26 and the external notification device 50 include an audio output device such as a speaker, the controller 140 may cause the HMI 26 and the external notification device 50 to output audio or an alarm corresponding to the content to be displayed on the display device described above. Meanwhile, the controller 140 may provide notification in a notification mode in which several of the above-described lamp indication, display indication, and audio output are combined.

The controller 140 notifies the occupant P of the state of the mobile object 1 by causing the HMI 26 to output the above-described content, and notifies the surroundings of the mobile object 1 of the state of the mobile object 1 by causing the external notification device 50 to output the content. This allows the occupant P, surrounding traffic participants (for example, pedestrians, other vehicles), and the like to more accurately ascertain the state of the mobile object 1. Therefore, the occupant P can be made to perform an appropriate driving operation according to the travel state, and surrounding traffic participants can be made to pass appropriately.

Figure 4:
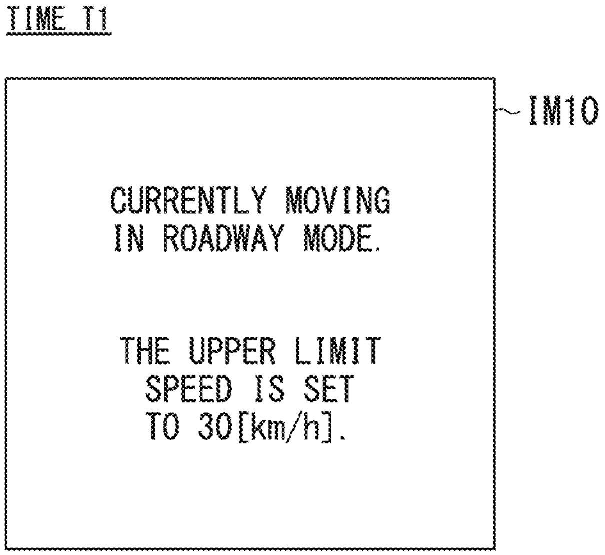
FIG. 4 is a diagram illustrating an example of notification content at time T1.

Hereinafter, specific examples of the content of notification at each of times T1 to T3 mentioned above will be described. FIG. 4 is a diagram illustrating an example of the content of notification at time T1. FIG. 4 shows an example of an image IM 10 which is displayed on a display screen in a case where the external notification device 50 includes a display device as an example. In addition, the display mode such as the content and layout displayed on the image IM 10 is not limited to the example of FIG. 4. The same applies to the subsequent drawings.

At time T1, the controller 140 generates the image IM 10 including information indicating that the mobile object 1 is traveling in the first travel state and information relating to the upper limit speed in the first travel state on the basis of the result of recognition performed by the road type recognizer 120, and causes the external notification device 50 to display the generated image IM 10. In the image IM 10 of FIG. 4, character information (text) such as "Currently moving in roadway mode" and "The upper limit speed is set to 30 [km/h]" is displayed. The roadway mode is a mode in which the mobile object 1 is in the first travel state. In addition, the upper limit speed is a speed associated with the first travel state, but is not limited to 30 [km/h] shown in FIG. 4. By the image IM 10 being displayed at time T1, it is possible to notify the surroundings that the mobile object 1 is traveling correctly on the roadway 200 in the roadway mode.

Figure 5:
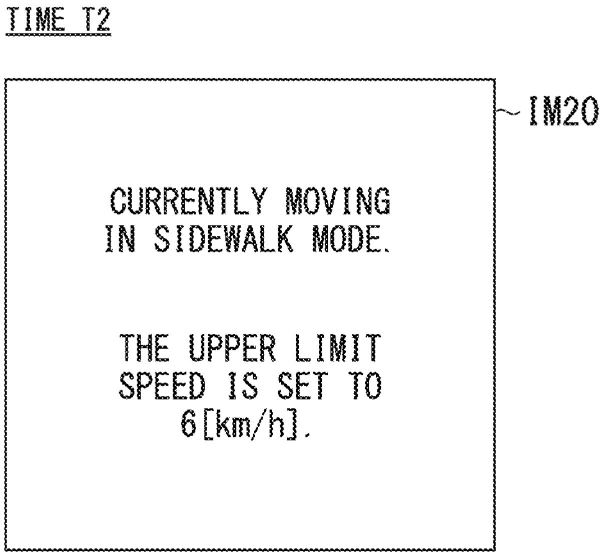
FIG. 5 is a diagram illustrating an example of notification content at time T2.

FIG. 5 is a diagram illustrating an example of the content of notification at time T2. At time T2, the controller 140 generates an image IM 20 including information indicating that the mobile object 1 is traveling in the second travel state and information relating to the upper limit speed in second travel state on the basis of the result of recognition performed by the road type recognizer 120, and causes the external notification device 50 to display the generated image IM 20. In the image IM 20 of FIG. 5, character information (text) such as "Currently moving in sidewalk mode" and "The upper limit speed is set to 6 [km/h]" is displayed. The sidewalk mode is a mode in which the mobile object 1 is in the second travel state. In addition, the upper limit speed is a speed associated with the second travel state, but is not limited to 6 [km/h] shown in FIG. 5. By the image IM 20 being displayed at time T2, it is possible to notify the surroundings that the mobile object 1 is traveling correctly on the sidewalk 210 in the sidewalk mode.

Figure 6:
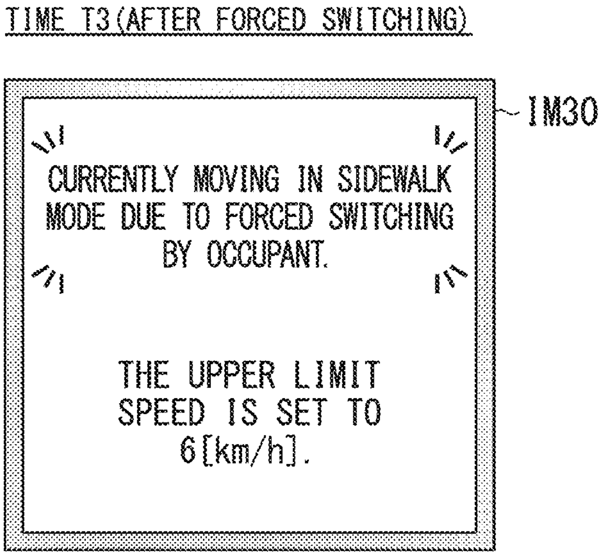
FIG. 6 is a diagram illustrating an example of notification content at time T3.

FIG. 6 is a diagram illustrating an example of the content of notification at time T3. At time T3 (after forced switching), the controller 140 generates an image IM 30 including information indicating that the mobile object 1 is forcibly traveling in the second travel state and information relating to the upper limit speed in the second travel state on the basis of the switching operation accepted by the forced changeover switch 24, and causes the external notification device 50 to display the generated image IM 30. In the image IM 30 of FIG. 6, character information (text) such as "Currently moving in sidewalk mode due to forced switching by occupant" and "The upper limit speed is set to 6 [km/h]" is displayed.

In addition, the controller 140 may blink some of the character information, change the font (thickness) or color, or change the color of the outer circumferential portion (edge) of the image IM 30 as shown in the image IM 30 in a case where the travel state is forcibly switched according to an instruction from the occupant P. In this way, by highlighting the display more than display in normal times (travel state based on the recognition result on the system side), it is possible to notify the surroundings more reliably, and to allow the surrounding traffic participants to pass while paying closer attention to the behavior of the mobile object 1. Therefore, it is possible to further improve the safety of the mobile object 1 in traveling control based on an instruction from the occupant P. The controller 140 may cause the display device of the HMI 26 to display the above-described images IM 10 to IM 30 instead of (or in addition to) the external notification device 50.

In addition, in a case where the switching operation of the travel state is accepted by the forced changeover switch 24, the controller 140 may acquire information on the position of the mobile object 1 from the positioning device 18 and notify an external device (for example, a management server) of the acquired position information through the communication device 20. This makes it possible for the server side to ascertain road points where the road type is more likely to be misrecognized by acquiring position information from one or more mobile objects 1. In addition, the server side can perform processing such as investigating the cause of misrecognition based on the ascertained road point, improving a recognition process (such as a program), and resolving the misrecognition by specifying the road type of the ascertained road point and notifying the mobile object 1. This makes it possible to reduce misrecognition and to perform more appropriate traveling control.

In addition, the controller 140 may add identification information of the mobile object 1 and identification information of the occupant P to the information on the position of the mobile object 1 and notify an external device. This makes it possible for the server side to, for example, specify the mobile object 1 or the occupant P who frequently performs a switching operation using the forced changeover switch 24, and to suppress inappropriate use of the forced changeover switch 24 by issuing a warning or the like to the specified mobile object 1 or occupant P.

Meanwhile, when the travel state can be switched using the forced changeover switch 24, there may be cases in which the occupant P switches the travel state inappropriately even through the system side has correctly recognized the road type and movement in the travel state corresponding to the recognized road type is performed. Consequently, in a case where a predetermined condition is satisfied, the controller 140 does not switch the traveling control even if the switching operation of the travel state is accepted by the forced changeover switch 24.

For example, as a predetermined condition, the controller 140 does not accept the switching operation of the travel state by the forced changeover switch 24 in a case where a specific driving mode out of a plurality of driving modes set in advance is being executed. The specific driving mode is, for example, a mode C (automated driving mode). In the case of the mode C, since the mobile object 1 is traveling along a target trajectory for avoiding an object, there is a possibility that the object cannot be avoided when the travel state is forcibly switched by the switching operation performed by the occupant P during execution of the mode C. Therefore, during execution of the mode C, the controller 140 performs control so as not to accept the switching operation of the travel state using the forced changeover switch 24. Meanwhile, in a case where the switching operation is performed using the forced changeover switch 24 during execution of the mode C, the controller 140 may notify the occupant P of information indicating that forced switching of the travel state is not possible.

Figure 7:
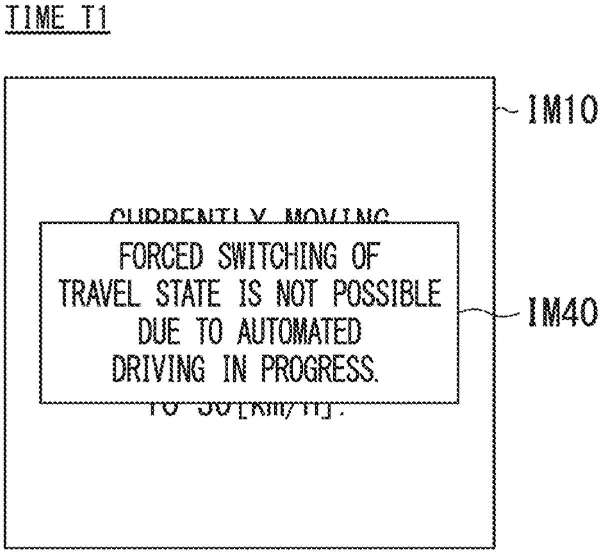
FIG. 7 is a diagram illustrating an example of information indicating that forced switching of travel states is not possible.

FIG. 7 is a diagram illustrating an example of information indicating that forced switching of the travel state is not possible. Meanwhile, the example of FIG. 7 shows an image IM 40 which is displayed on the display device included in the HMI 26 in a case where the mode C is being executed at time T1 and a case where an operation for switching the travel state is accepted by the forced changeover switch 24. For example, at time T1, in a case where an operation for switching the travel state is accepted by the forced changeover switch 24 during execution of the mode C, the controller 140 generates the image IM 40 indicating that forced switching is not possible, and causes the HMI 26 to display the generated image IM 40. Meanwhile, in the example of FIG. 7, the image IM 40 is superimposedly displayed on the image IM 10, but the image IM 10 may be switched to the image IM 40 for display. In the image IM 40 of FIG. 7, character information (text) such as "Forced switching of travel state is not possible due to automated driving in progress" is displayed. This makes it possible to allow the occupant P to more accurately ascertain the reason why the travel state is not switched.

In addition, as a predetermined condition, the controller 140 may not switch the traveling control based on the operation accepted by the forced changeover switch 24, as described above, in a case where the degree of recognition of the road type in the road type recognizer 120 is equal to or greater than a threshold. In addition, the controller 140 may forcibly perform the traveling control corresponding to the instruction accepted by the forced changeover switch 24 only while the degree of recognition is less than the threshold, terminate the above traveling control in a case where the degree returns to the threshold or more, and switch to traveling control based on the recognition result of the road type.

This makes it possible to allow switching of the travel state according to the instruction from the occupant P in the situation where there is a high possibility of the road type being misrecognized, and to suppress switching of the travel state according to the instruction from the occupant P in the situation where the accuracy of recognition on the system side is high, so that more appropriate traveling control can be performed.

MODIFICATION EXAMPLE

In the embodiment described above, instead of forcibly switching from the first travel state to the second travel state on the basis of the switching operation accepted by the forced changeover switch 24, forced switching to first traveling control may be performed by the switching operation of the forced changeover switch 24 in a case where the second travel state is being executed on the basis of the result of recognition of the road type and the like performed by the system side.

In addition, in the embodiment, although the mode of notification to the occupant P or the surroundings was made different for each travel state or depending on whether the traveling control based on the switching operation accepted by the forced changeover switch 24 was switched, notification in different notification modes for each driving mode during execution of the mobile object 1 may be performed instead of (or in addition to) this.

[Process Flow]

Figure 8:
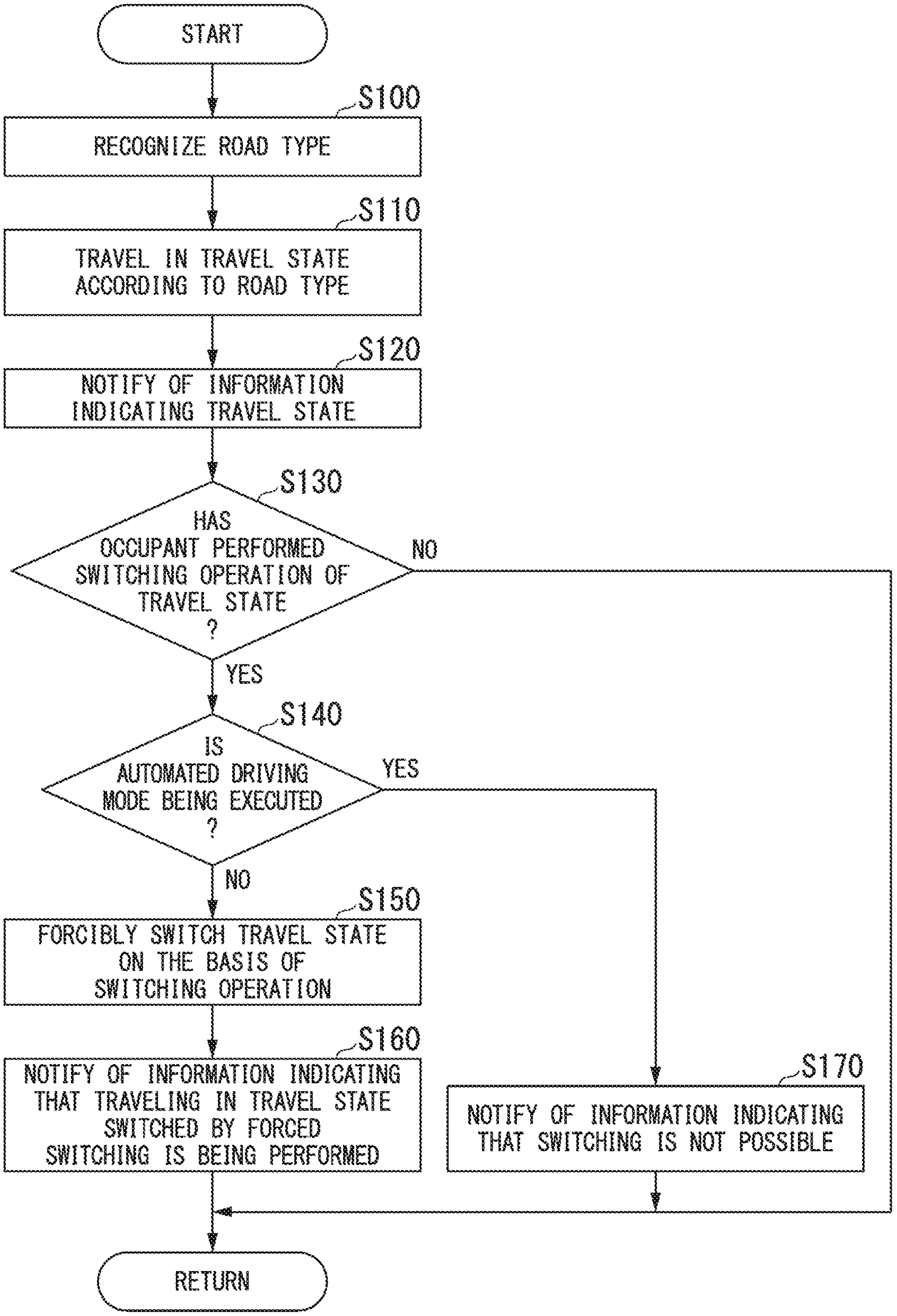
FIG. 8 is a flowchart illustrating an example of a flow of processes executed by the control device 100 according to the embodiment.

FIG. 8 is a flowchart illustrating an example of a flow of processes executed by the control device 100 according to the embodiment. Meanwhile, in the example shown in FIG. 8, description will focus particularly on travel state control and a notification process among various processes which are executed by the control device 100. The processes shown in FIG. 8 may be repeatedly executed at a predetermined timing.

In the example of FIG. 8, the road type recognizer 120 recognizes the type of road on which the mobile object 1 is traveling (step S100). Next, the controller 140 causes the mobile object 1 to travel in a travel state according to the recognized road type (step S110). Next, the controller 140 notifies the occupant P and/or the surroundings of information indicating the travel state (step S120).

Next, the controller 140 determines whether the occupant has performed the switching operation of the travel state (step S130). In a case where it is determined that the occupant has performed the switching operation of the travel state, the controller 140 determines whether the mobile object 1 is executing the automated driving mode (step S140). In a case where it is determined that the automated driving mode is not being executed, the controller 140 forcibly switches the travel state on the basis of the switching operation until the occupant performs a cancellation operation (step S150). Next, the controller 140 notifies the occupant P and/or the surroundings of information indicating that traveling in the travel state switched by forced switching is being performed (step S160). In addition, in a case where it is determined in step S140 that the automated driving mode is being executed, the controller 140 notifies the occupant P of information indicating that switching is not possible (step S170). This terminates the processing of the present flowchart. In addition, in a case where it is determined in the process of step S130 that the occupant has not performed the switching operation of the traveling control, the processing of the present flowchart ends.

In the process of step S140 described above, instead of determining whether the automated driving mode is being executed, the controller 140 may determine whether the degree of recognition of the road type is equal to or greater than a threshold, or may determine whether another predetermined condition under which the travel state cannot be forcibly switched is satisfied.

According to the embodiment described above, there is provided a device 100 for controlling a mobile object 1 which one or more occupants are on board and which is movable both on a roadway and in a predetermined region different from the roadway, the device including: a road type recognizer 120 configured to recognize which type of road the mobile object is moving on, out of the roadway and the predetermined region, on the basis of an output of an external detection device 10 that detects an outside situation of the mobile object 1; and a controller 140 configured to move the mobile object in either a first travel state in which a speed of the mobile object 1 is limited to a first speed or a second travel state in which the speed of the mobile object 1 is limited to a second speed lower than the first speed on the basis of the road type recognized by the road type recognizer 120, wherein the controller 140 moves the mobile object in the first travel state in a case where it is recognized that the mobile object 1 is moving on the roadway, moves the mobile object in the second travel state in a case where it is recognized that the mobile object 1 is moving in the predetermined region, and forcibly switches the travel state under control even in a case where it is recognized that the mobile object 1 is moving on the roadway or in the predetermined region when an operation for switching the travel state is performed by a switching operation unit that accepts a switching operation of the travel state performed by the occupant, whereby it is possible to move the mobile object in a more appropriate travel state in accordance with the road conditions during movement.

The above-described embodiment can be represented as follows.

A device for controlling a mobile object including:

a storage medium that stores computer-readable instructions for controlling a mobile object which one or more occupants are on board and which is movable both on a roadway and in a predetermined region different from the roadway; and a processor connected to the storage medium, wherein the processor executes the computer-readable instructions to recognize which type of road the mobile object is moving on, out of the roadway and the predetermined region, on the basis of an output of an external detection device that detects an outside situation of the mobile object, move the mobile object in either a first travel state in which a speed of the mobile object is limited to a first speed or a second travel state in which the speed of the mobile object is limited to a second speed lower than the first speed on the basis of the recognized road type, move the mobile object in the first travel state in a case where it is recognized that the mobile object is moving on the roadway, move the mobile object in the second travel state in a case where it is recognized that the mobile object is moving in the predetermined region, and forcibly switch the travel state under control even in a case where it is recognized that the mobile object is moving on the roadway or in the predetermined region when an operation for switching the travel state is performed by a switching operation unit that accepts a switching operation of the travel state performed by the occupant.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

10 External detection device
12 Mobile object sensor
14 Operator
16 Internal camera
18 Positioning device
20 Communication device
22 Mode changeover switch
24 Forced changeover switch
26 HMI
30 Movement mechanism
40 Driving device
50 External notification device
70 Storage device
100 Control device
120 Road type recognizer
130 Object recognizer
140 Controller

The invention claimed is:

1. A device for controlling a mobile object which one or more occupants are on board and which is movable both on a roadway and in a predetermined region different from the roadway, the device comprising:

a processor that executes instructions to:

recognize which road type the mobile object is moving on, the roadway or the predetermined region, based on a situation occurring external to the mobile object; and move the mobile object in either a first travel state in which a speed of the mobile object is limited to a first speed or a second travel state in which the speed of the mobile object is limited to a second speed that is lower than the first speed based on the road type, wherein the processor moves the mobile object in the first travel state in a case where it is recognized that the mobile object is moving on the roadway, moves the mobile object in the second travel state in a case where it is recognized that the mobile object is moving in the predetermined region, and forcibly switches the travel state under control even in a case where it is recognized that the mobile object is moving on the roadway or in the predetermined region when an operation for switching the travel state is performed in response to receiving, from the occupant, a switching operation that causes the travel state to be switched, wherein the processor does not switch the travel state based on the switching operation in a case where a degree of recognition of the road type is equal to or greater than a threshold value, and wherein the processor performs the switching operation when the degree of recognition of the road type is less than the threshold value.

2. The device for controlling the mobile object according to claim 1, wherein, in a case where the travel state is switched based on a performance of the switching operation, the processor notifies the occupant of the mobile object of information indicating that the travel state has been forcibly switched.

3. The device for controlling the mobile object according to claim 1, wherein, in a case where the travel state is switched based on the switching operation, the processor notifies the occupant of the mobile object of information indicating which of the first travel state and the second travel state the mobile object is moving in.

4. The device for controlling the mobile object according to claim 1, wherein the processor makes a notification mode in a case of notification of the travel state being switched by the switching operation that is different from that in a case of notification of the travel state determined based on the road type.

5. The device for controlling the mobile object according to claim 1, wherein the processor:

moves the mobile object in any of a plurality of driving modes which are set in advance, and does not switch the travel state based on the switching operation in a case where the driving mode being executed is a specific driving mode.

6. The device for controlling the mobile object according to claim 1, wherein the processor notifies an external device of information on a position of the mobile object in a case where the switching operation of the travel state is being performed.

7. A method for controlling a mobile object, comprising causing a computer that controls a mobile object which one or more occupants are on board and which is movable both on a roadway and in a predetermined region different from the roadway, wherein the computer comprising a processor executes instructions, comprising:

recognizing which road type the mobile object is moving on, the roadway or the predetermined region, based on a situation occurring external to the mobile object;

moving the mobile object in either a first travel state in which a speed of the mobile object is limited to a first speed or a second travel state in which the speed of the mobile object is limited to a second speed that is lower than the first speed based on the road type;

moving the mobile object in the first travel state in a case where it is recognized that the mobile object is moving on the roadway;

moving the mobile object in the second travel state in a case where it is recognized that the mobile object is moving in the predetermined region; and forcibly switching the travel state under control even in a case where it is recognized that the mobile object is moving on the roadway or in the predetermined region when an operation for switching the travel state is performed in response to receiving, from the occupant, a switching operation that causes the travel state to be switched, wherein the processor does not switch the travel state based on the switching operation in a case where a degree of recognition of the road type is equal to or greater than a threshold value, and where the processor performs the switching operation when the degree of recognition of the road type is less than the threshold value.

8. A non-transitory machine-readable storage medium having a program stored therein, the program causing a computer that controls a mobile object which one or more occupants are on board and which is movable both on a roadway and in a predetermined region different from the roadway, wherein the computer comprises a processor configured to:

recognize which road type the mobile object is moving on, the roadway or the predetermined region, based on a situation occurring external to the mobile object;

move the mobile object in either a first travel state in which a speed of the mobile object is limited to a first speed or a second travel state in which the speed of the mobile object is limited to a second speed that is lower than the first speed based on the road type;

move the mobile object in the first travel state in a case where it is recognized that the mobile object is moving on the roadway;

move the mobile object in the second travel state in a case where it is recognized that the mobile object is moving in the predetermined region; and forcibly switch the travel state under control even in a case where it is recognized that the mobile object is moving on the roadway or in the predetermined region when an operation for switching the travel state is performed in response to receiving, from the occupant, a switching operation that causes the travel state to be switched, wherein the processor does not switch the travel state based on the switching operation in a case where a degree of recognition of the road type is equal to or greater than a threshold value, and where the processor performs the switching operation when the degree of recognition of the road type is less than the threshold value.

* * * * *